United States Patent
Douglas et al.

(10) Patent No.: US 8,453,335 B2
(45) Date of Patent: Jun. 4, 2013

(54) METHOD AND APPARATUS DETERMINATION OF WHEEL ASSEMBLY CONFIGURATION

(75) Inventors: Michael W. Douglas, St. Charles, MO (US); David M. Scribner, St. Charles, MO (US)

(73) Assignee: Hunter Engineering Company, St. Louis, MO (US)

( * ) Notice: Subject to any disclaimer, the term of this patent is extended or adjusted under 35 U.S.C. 154(b) by 1461 days.

(21) Appl. No.: 12/062,724

(22) Filed: Apr. 4, 2008

(65) Prior Publication Data

US 2008/0244919 A1    Oct. 9, 2008

Related U.S. Application Data

(60) Provisional application No. 60/910,085, filed on Apr. 4, 2007.

(51) Int. Cl.
*G01B 5/24* (2006.01)
(52) U.S. Cl.
USPC .......................... 33/203.16; 73/121
(58) Field of Classification Search
USPC ................ 73/460, 121; 33/203.16, 203.19
See application file for complete search history.

(56) References Cited

U.S. PATENT DOCUMENTS

| | | | | |
|---|---|---|---|---|
| 3,630,077 A * | 12/1971 | Boileau | ............................ | 73/146 |
| 3,744,321 A * | 7/1973 | Hauge | ............................ | 73/457 |
| 3,979,968 A * | 9/1976 | Ceccherini | ...................... | 74/498 |
| 4,139,041 A * | 2/1979 | Newton | ........................... | 157/13 |
| 4,244,416 A * | 1/1981 | Newton | ........................... | 157/13 |
| 4,372,625 A * | 2/1983 | Petros | ........................... | 384/129 |
| 4,812,094 A * | 3/1989 | Grube | ........................... | 411/134 |
| 5,103,595 A * | 4/1992 | Dale et al. | ......................... | 451/5 |
| 5,105,554 A * | 4/1992 | Schnyder et al. | ............... | 337/83 |
| 5,105,595 A * | 4/1992 | Tokei et al. | ...................... | 52/381 |
| 5,237,505 A * | 8/1993 | Beebe | ............................. | 73/459 |
| 5,396,436 A * | 3/1995 | Parker et al. | ................... | 700/279 |
| 5,490,432 A * | 2/1996 | Allard et al. | ................. | 73/865.9 |
| 5,739,428 A * | 4/1998 | Bux et al. | ......................... | 73/146 |
| 5,778,553 A * | 7/1998 | Hollensbe | ........................ | 33/810 |
| 5,818,574 A * | 10/1998 | Jones et al. | .............. | 356/139.09 |
| 5,856,624 A * | 1/1999 | Elsing | ............................ | 73/865.9 |
| 6,016,695 A * | 1/2000 | Reynolds et al. | ............... | 73/146 |
| 6,058,767 A * | 5/2000 | Calvin | ........................ | 73/115.06 |

(Continued)

OTHER PUBLICATIONS

"Tire Talk—Getting A Custom'ed to Tire/Wheel Packages"—Tomorrow's Technician—pp. 30, 31, & 32 Dated Apr. 2003.

(Continued)

*Primary Examiner* — Peter MacChiarolo
*Assistant Examiner* — Samir M Shah
(74) *Attorney, Agent, or Firm* — Polster, Lieder, Woodruff & Lucchesi, L.C.

(57) ABSTRACT

A vehicle wheel assembly service system configured to acquire measurements of the physical characteristics of a vehicle wheel assembly such as during a vehicle wheel balancing procedure, with the functionality to obtain and utilize a measurement of a vehicle wheel assembly offset or rear spacing. The vehicle wheel assembly service system is configured to display the wheel assembly offset or rear spacing measurement to an operator, and optionally, to display guidance and/or installation instructions to the operator associated with the installation of the vehicle wheel assembly on a vehicle. The displayed guidance and/or installation instructions may optionally include fitment information, vehicle performance data, or vehicle braking data.

23 Claims, 5 Drawing Sheets

U.S. PATENT DOCUMENTS

| | | | |
|---|---|---|---|
| 6,122,957 | A | 9/2000 | Bux et al. |
| 6,257,078 | B1 * | 7/2001 | Vencill .................. 73/865.9 |
| 6,336,364 | B1 * | 1/2002 | Parker et al. ................ 73/462 |
| 6,484,574 | B1 | 11/2002 | Douglas et al. |
| 6,588,106 | B1 * | 7/2003 | Pankl et al. ............. 29/894.361 |
| 6,588,119 | B1 * | 7/2003 | Russell et al. ............... 33/517 |
| 6,782,766 | B2 * | 8/2004 | Parkinson ............... 73/862.329 |
| 6,993,852 | B2 * | 2/2006 | Russell et al. ............... 33/517 |
| 7,064,818 | B2 | 6/2006 | Braghiroli |
| 7,228,932 | B2 * | 6/2007 | Rosenthal et al. ............ 180/271 |
| 7,552,542 | B2 * | 6/2009 | Nilsson et al. ................ 33/517 |
| 2004/0050178 | A1 * | 3/2004 | Parkinson ............... 73/862.328 |
| 2009/0301192 | A1 * | 12/2009 | Douglas et al. ................ 73/460 |

OTHER PUBLICATIONS

"Wheel Technical Information"—reprint from www.rsracing.com/tech-wheel.html—dated Mar. 1, 2002.

* cited by examiner

METHOD AND APPARATUS DETERMINATION OF WHEEL ASSEMBLY CONFIGURATION

CROSS-REFERENCE TO RELATED APPLICATIONS

The present application is related to, and claims priority from, U.S. Provisional Patent Application Ser. No. 60/910,085 filed on Apr. 4, 2007, which is herein incorporated by reference.

STATEMENT REGARDING FEDERALLY SPONSORED RESEARCH

Not Applicable.

BACKGROUND OF THE INVENTION

The present invention is related generally to vehicle wheel service equipment, and in particular, to vehicle wheel service equipment such as a vehicle wheel balancing system, which is configured to measure vehicle wheel assembly configurations, including size, offset, and rear spacing parameters.

Figure 1:
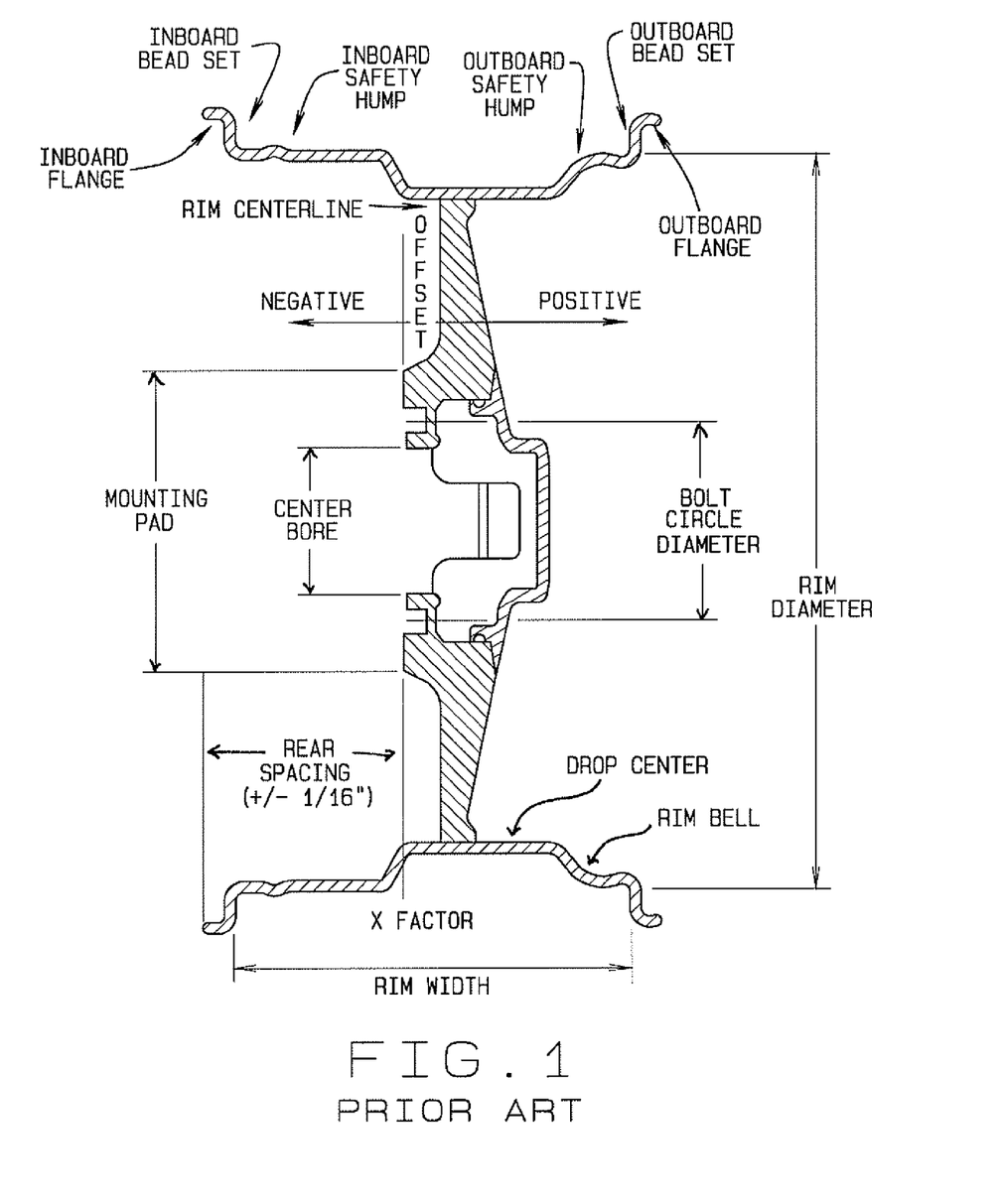
FIG. 1 is a cross section illustration of a vehicle wheel assembly identifying conventional nomenclature.
Figure 2A:
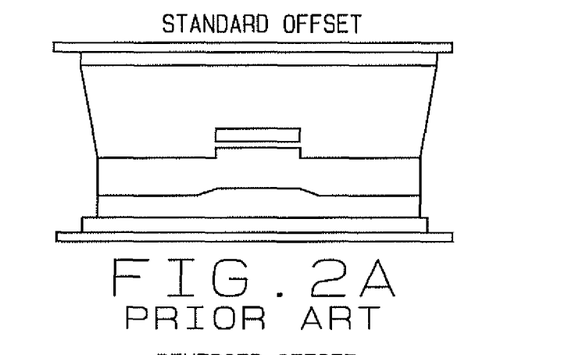
FIG. 2 is a series of sectional illustrations of various vehicle wheel assemblies having different offsets and rear spacing.
Figure 2B:
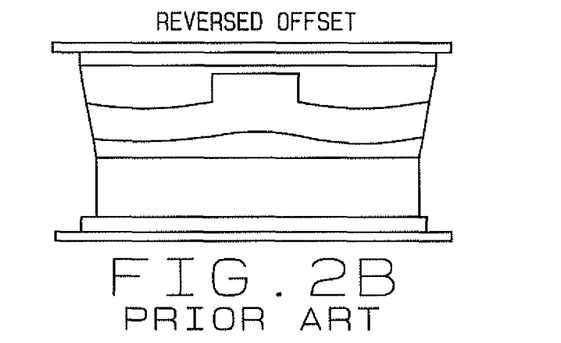
Figure 2C:
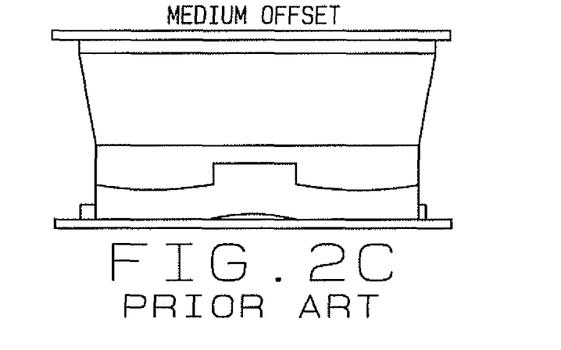
Figure 2D:
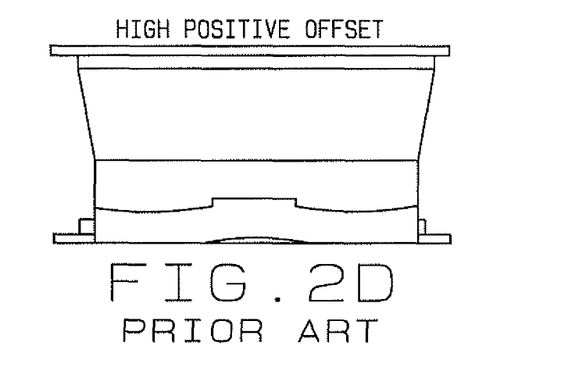

A typical vehicle wheel assembly, such as shown in FIG. 1, may be described using a number of conventional measurements and feature descriptions. These measurements include the rim diameter, the rim width, the offset, the backside setting (rear spacing), the caliper clearance, and the bolt circle. Common feature descriptions include the mounting pad, the center bore, the drop center, the rim bell, the safety humps (inner and outer), the bead seats (inner and outer), and the wheel weight contour or flanges (inner and outer). By providing various values for the conventional measurements and features of a vehicle wheel assembly, the general characteristics of the wheel assembly will be known.

Vehicle wheel assemblies, which consist of a tire mounted to a wheel rim, are manufactured and assembled in ever increasing varieties and configurations. Customized vehicles often replace the original equipment vehicle wheel assemblies with wheel assemblies having greater diameters, lower profile tires, and different offset measurements. Some of these changes are made by the vehicle owner for cosmetic purposes, while others are made for purposes of improving vehicle handling or performance characteristics. For example, very large tires mounted to smaller wheel rims are commonly added to off-road vehicles to facilitate low-speed movement over difficult terrain. Conversely, larger wheel rims combined with very low profile tires are often added to performance vehicles such as sports cars, to provide an increase in tire contact patch size and to improve high-speed vehicle performance or vehicle appearance in the eyes of the consumer.

When a vehicle wheel assembly which does not conform to a vehicle manufacturer's original specifications is installed on a vehicle, a number of fitment and vehicle handling problems can arise. For example, by increasing the overall outer diameter of the wheel assembly, either through the installation of a different profile tire on the wheel rim, and/or the use of a larger diameter wheel rim, interference can occur between the wheel assembly and vehicle structure. Similarly, if the wheel rim diameter is decreased, there may not be sufficient clearance for brake components installed on the wheel hub. Once measure which may have a significant effect on the fitment of a vehicle wheel assembly is the offset measurement.

As seen in FIGS. 1 and 2, the offset of a vehicle wheel assembly is the distance between the mounting pad surface and the centerline of the vehicle wheel rim, defined as the midpoint between the inner and outer rim edges. If the mounting pad is axially displaced towards the outside (i.e. street side) of the vehicle wheel assembly, it is referred to as a positive offset. Conversely, if the mounting pad is axially displaced towards the inside (i.e. vehicle centerline), it is referred to as a negative offset. A zero offset indicates the hub mounting surface is at the exact centerline of the rim. An alternative axial measurement associated with the mounting pad is known as the rear or back spacing, and is defined as the distance between the inner rim edge and the mounting pad surface. In the case of a wheel having a zero offset, the rear or back spacing would be equal to ½ the rim width (plus the thickness of the inboard flange on the rim). Offset is usually measured in millimeters (mm) and often has the designation "ET" added to the offset measurement, for example, a 19 mm offset may be listed as ET19. Note that offset and backspacing are related but measured at slightly different points.

Given the structure of most vehicle wheel assemblies, manual measurement of the offset is complicated and often inaccurate, requiring a measurement of the rim width, identification of the wheel rim centerline, and a measurement of the displacement of the mounting pad from the calculated wheel rim centerline.

Accordingly, it would be advantageous to provide a vehicle wheel assembly service system, such as a vehicle wheel balancer system or a vehicle wheel tire changing system, with the functionality necessary to measure the offset or rear spacing of a vehicle wheel assembly, and to display to an operator associated vehicle wheel assembly parameters. It would be further advantageous to provide a vehicle service system with the functionality to utilize measured vehicle wheel assembly offset or rear spacing information, with or without other vehicle wheel assembly parameters, to provide an operator with guidance and/or instruction regarding the installation of the vehicle wheel assembly on a specific type of vehicle. It would be further advantageous to provide the aforementioned functionality in a vehicle wheel assembly service system which is configured to acquire measurements of the physical characteristics of a vehicle wheel assembly, such as during a vehicle wheel balancing or vehicle wheel tire changing procedure.

BRIEF SUMMARY OF THE INVENTION

Briefly stated, the present disclosure provides a vehicle wheel assembly service system with the functionality necessary to facilitate measurement of one or more axial displacement parameters associated with the mounting pad of a vehicle wheel assembly, such as the offset or rear spacing of the vehicle wheel assembly.

An embodiment of the present disclosure provides a vehicle wheel assembly service system with the functionality to utilize measured vehicle wheel assembly axial displacement parameters associated with the wheel assembly mounting pad, with or without other vehicle wheel assembly parameters, to provide an operator with guidance and/or instruction regarding the installation of the vehicle wheel assembly on a specific type of vehicle.

An embodiment of the present disclosure provides a vehicle wheel balancer system, which is configured to acquire measurements of the physical characteristics of a vehicle wheel assembly such as during a vehicle wheel balancing procedure, with the functionality to obtain and utilize a measurement of one or more axial displacement parameters associated with the mounting pad of a vehicle wheel assembly. The vehicle wheel balancer system is optionally configured to display the axial displacement parameters to an operator, and/or to display guidance and/or installation instructions to the operator associated with the installation of the vehicle wheel assembly on a vehicle. The displayed guidance and/or installation instructions may optionally include fitment information, vehicle performance data, or vehicle braking data.

A second embodiment of the present disclosure provides a vehicle tire changing system, which is configured to acquire measurements of the physical characteristics of a vehicle wheel assembly such as during a vehicle wheel tire changing (mount/dismount) procedure, with the functionality to obtain and utilize a measurement of one or more axial displacement parameters associated with the mounting pad of a vehicle wheel assembly. The vehicle wheel tire changing system is optionally configured to display the wheel assembly axial displacement parameters to an operator, and/or to display guidance and/or installation instructions to the operator associated with the installation of the vehicle wheel assembly on a vehicle. The displayed guidance and/or installation instructions may optionally include fitment information, vehicle performance data, or vehicle braking data.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

DESCRIPTION OF THE PREFERRED EMBODIMENT

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 3:
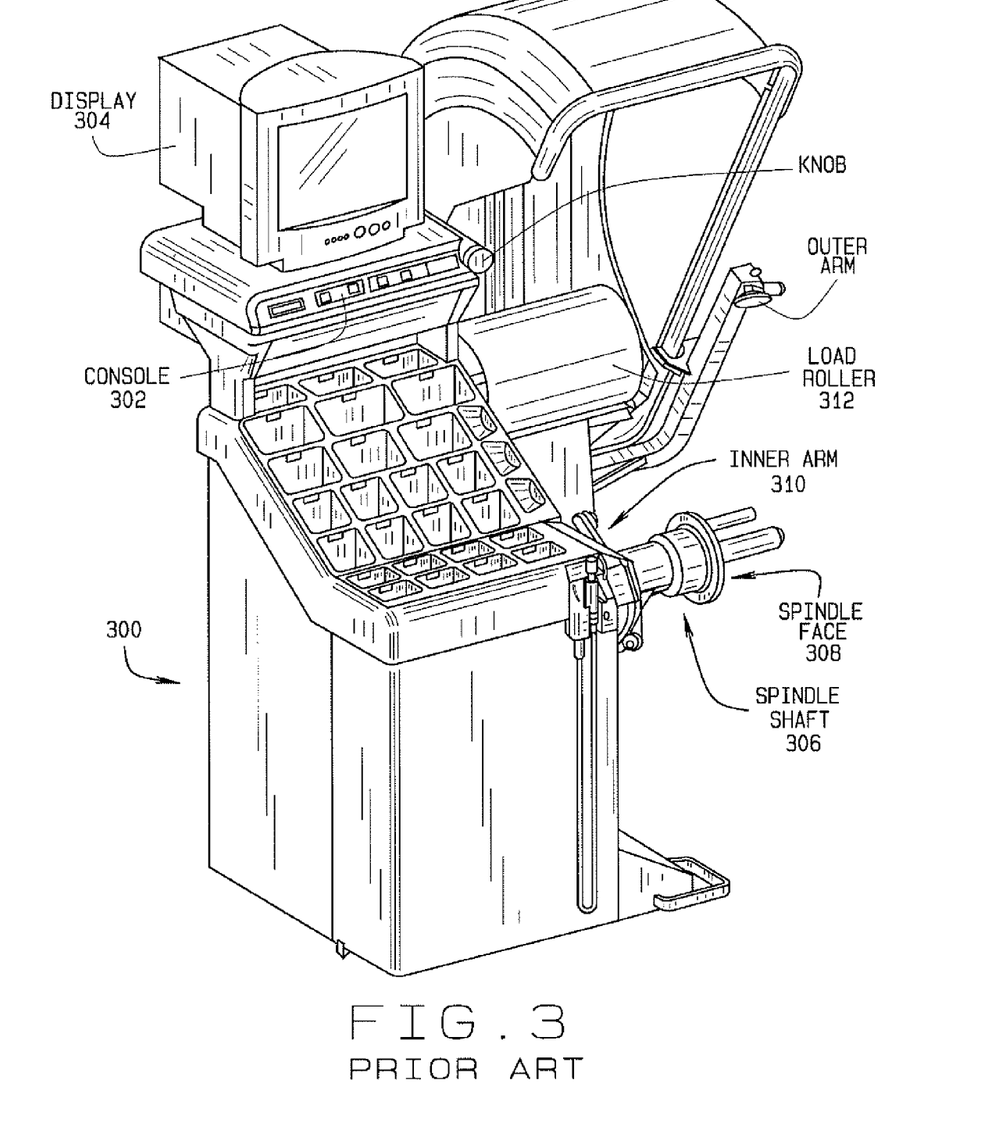
FIG. 3 is an illustration of a prior art vehicle wheel balancing system in operation during measurement of a vehicle wheel assembly rim dimensions.
Figure 4:
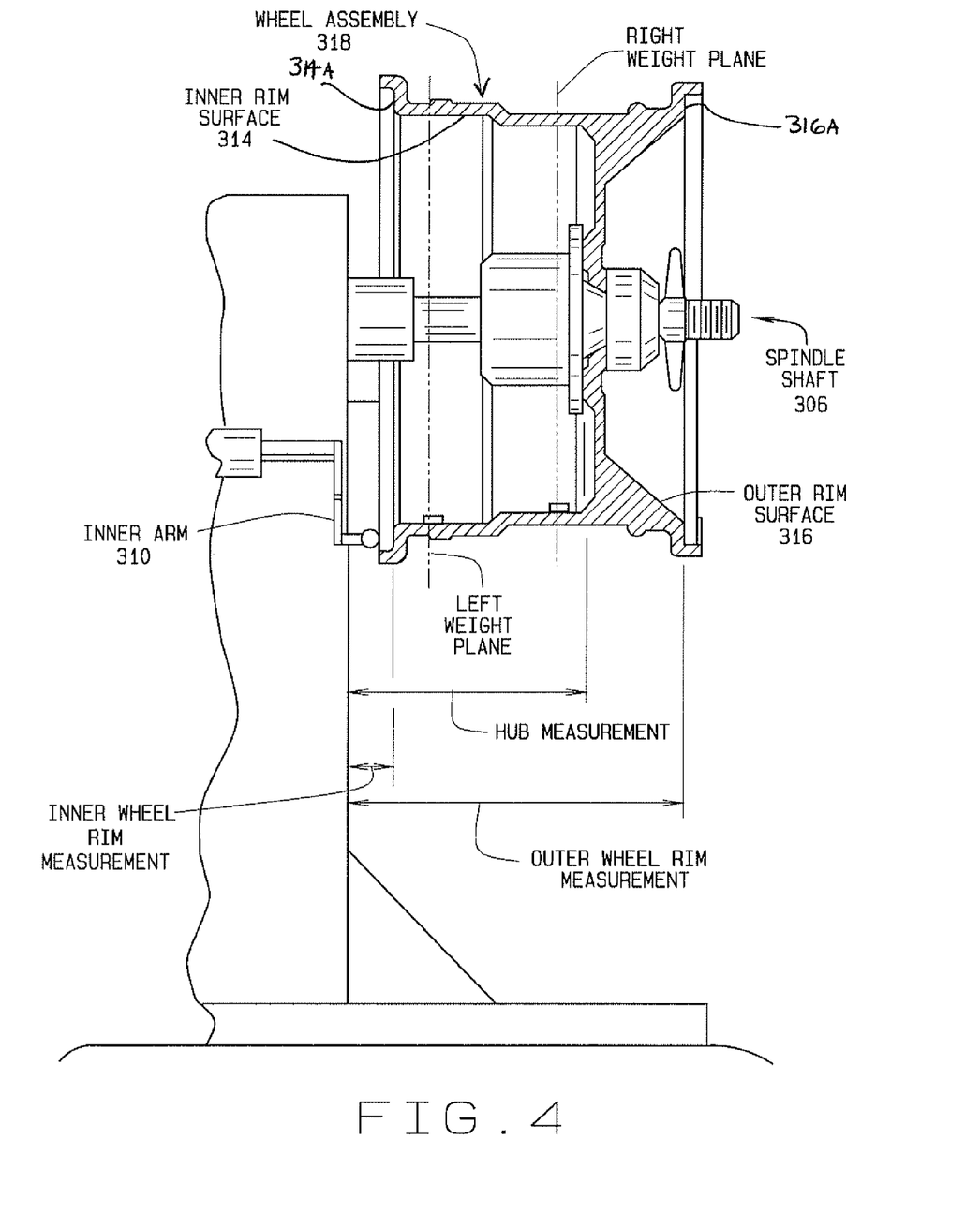
FIG. 4 is an illustration of a vehicle wheel assembly mounted on a vehicle wheel balancer spindle, and identifies various dimensional measurements associated therewith.

Turning to FIGS. 3 and 4, a vehicle wheel balancing system 300 is shown having features which are readily recognizable to one of ordinary skill in the art. The vehicle wheel balancing system consists generally of a console 302 and a spindle shaft 306. The spindle shaft 306 is operatively coupled to drive motors and vibration sensors disposed within the console 302. One or more processing systems disposed within the housing control the operation of the drive motors, and receive signals from the vibration sensors for display of vehicle wheel imbalance characteristics to an operator on an associated display console 304. The display console 304 is further utilized to interact with an operator and may incorporate or be associated with various input devices such as keys, knobs, or touch-screens.

During operation, a vehicle wheel assembly 318 undergoing measurement and imbalance correction procedures is mounted to the spindle shaft 306 by sliding the wheel assembly 318 along the shaft until the vehicle wheel assembly mounting pad is abutting a spindle face 308. The wheel assembly 318 is secured onto the spindle shaft 306 against the spindle face 308 by various conventional clamping mechanisms which are well known to those of ordinary skill in the art. The spindle face 308 is disposed at a known axial position along the spindle shaft 306, providing a determinable axial position for the vehicle wheel assembly mounting pad.

The vehicle wheel balancing system 300 further includes means for measuring the axial displacement of points on the inner 314 and outer 316 wheel rim surfaces along the axis of the spindle shaft 306. As shown in FIGS. 3 and 4, these measurement means may include mechanical arms 310, 312 which are physically moved into contact with the inner 314 and outer 316 wheel rim surfaces. Movement of the mechanical arms 310, 312 relative to the axis of the spindle shaft 306 is observed by suitable sensors, and conveyed to the processing system of the vehicle wheel balancer 300, providing measurement data associated with the position of each wheel rim surface 314, 316. If the vehicle wheel assembly 318 is rotated about the axis of the spindle shaft 306 while a series of axial position measurements are acquired by the measurement means, circumferential profiles of the inner 314 and outer 316 wheel rim surfaces may be generated, providing measures of wheel rim width, wheel rim runout, and wheel rim defects. It will be recognized by those of ordinary skill in the art that the mechanical means for providing measurements associated with the wheel rim surfaces 314, 316 may be replaced by non-contact measurement means, such as optical imaging systems or acoustical measurement systems.

In one embodiment of the present invention, the processing system of the vehicle wheel balancer 300 is configured to utilize measurements which identify the axial positions of the inner and outer wheel rim edges 314A and 316A of the inner and outer wheel rim surfaces 314, 316 of the vehicle wheel assembly 318, in combination with the known axial position of the spindle face 308, to identify an offset measurement associated with a vehicle wheel assembly 318 mounted on the spindle shaft 306.

In an alternate embodiment of the present invention, the processing system of the vehicle wheel balancer 300 is configured to utilize measurements which identify the axial position of the inner wheel rim edge 314A of the inner wheel rim surface 314 of the vehicle wheel assembly 318, in combination with the known axial position of the spindle face 308, to identify a rear spacing measurement associated with a vehicle wheel assembly 318 mounted on the spindle shaft 306.

The processing system may be configured to access data associated with wheel assembly clearances for one or more vehicles, and to compare measured characteristic of a vehicle wheel assembly, including the determined offset or rear spacing measurement, with the stored data associated with a vehicle identified by an operator to determine if the vehicle wheel assembly will encounter clearance problems upon installation on the identified vehicle (i.e. if a particular combination of wheel assembly offset, width, and tire size will rub or interfere with the vehicle body, or if sufficient clearance will be provided for vehicle brake and suspension components). The accessed data may be entered manually by an operator, or retrieved from a database of stored vehicle specifications. The processing system may be configured to identify alternative vehicle wheel assembly configurations for installation on the identified vehicle, or required modifications to the identified vehicle for fitment of the current vehicle wheel assembly. These identified modifications may include the installation of one or more spacer components to the vehicle or wheel.

Optionally, the processing system may be configured to access the stored data associated with the identified vehicle to provide the operator with information related to the effects of installing the vehicle wheel assembly on the vehicle. The information may include, but is not limited to, variation in vehicle braking performance, variation in vehicle handling performance (including induced inaccuracy in speedometer and odometer readings), changes in vehicle appearance (i.e., wheel profiles, the amount of wheel projection past the vehicle fenders, etc.), and changes in vehicle configuration (i.e. body roll, body height, vehicle center of gravity, etc.).

The processing system may be configured to access stored data associated with original equipment manufacturer (OEM) wheel assembly configurations for a plurality of vehicles, and to compare measured characteristic of a vehicle wheel assembly mounted to the spindle with the stored data associated with a vehicle identified by an operator to determine if the vehicle wheel assembly is an OEM configuration for the identified vehicle.

In an alternate embodiment, the processing system may be configured to acquire measurements associated with a vehicle wheel which has been removed from a vehicle, store those measurements, and then to utilize the stored measurements to determine if a replacement wheel assembly, having different dimension, will properly fit on the vehicle and/or how the replacement wheel will effect the operating characteristics of the vehicle.

Figure 5:
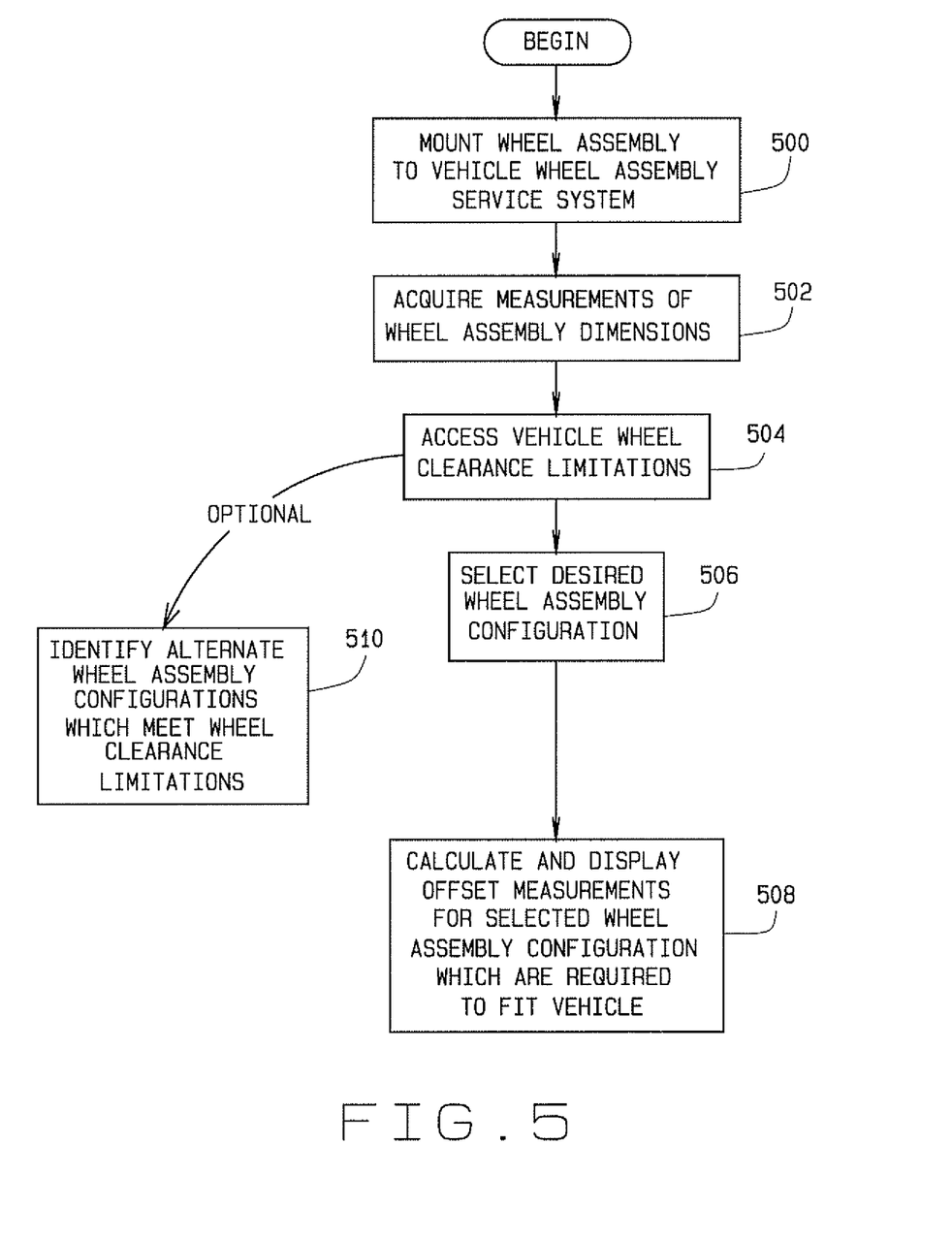
FIG. 5 is a flow chart illustrating the steps in an exemplary method of the present invention.

An exemplary procedure for operating a vehicle wheel balancer system 300 or other vehicle wheel assembly service system configured to implement the functionality of the present invention for determining axial displacements such as offset or back spacing for a wheel assembly mounting pad is illustrated in FIG. 5, and may utilize the following steps:

First, a vehicle wheel assembly 318, consisting of a wheel rim and mounted tire, is mounted to a spindle shaft 306 in a conventional manner which seats the wheel assembly mounting pad against a spindle face 308 of the shaft 306 (Box 500). Measurements of the wheel assembly dimensions, and which may include or more of the tire diameter, tire foot print width, wheel assembly rim flange width, and wheel assembly rim flange diameter, are acquired and input to the processing system of the vehicle wheel balancer 300 (Box 502). These measurements may be acquired through the use of data acquisition components 310, 312 associated with the vehicle wheel balancer system 300, or may be entered manually by an operator. Using the input measurements, together with the known position of the spindle face 308 on the rotating shaft 308, the processing system determines one or more axial displacements associated with the mounting pad, such as wheel back spacing or offset.

If the operator is considering the placement of oversize (Plus size) wheel assembly configurations on a vehicle, the operator may identify to the processing system wheel diameter and width clearance limitations associated with the vehicle, or alternatively, may instruct the processing system to utilize a database of stored information to retrieve wheel clearance limitation values for a selected vehicle (Box 504). Next, the operator selects the oversize (Plus size) of the wheel assembly configuration which is desired to be installed on the vehicle, either by direct input or by selection from a database of available sizes (Box 506).

Following the selection of the oversize (Plus size) of wheel assembly which is desired to be installed on the vehicle, the processing system calculates and displays to the operator a wheel assembly offset or back spacing measurement required for fitment of the selected oversize wheel assembly to the identified vehicle (Box 508). Additional information such as overhang to the outside and new tire diameter measurements which are associated with the selected oversize wheel assembly at the calculated offset measurement may be determined and displayed by the processing system.

A second exemplary procedure for operating a vehicle wheel balancer system of the present disclosure requires the operator to provide measurements associated with the clearance of a current vehicle wheel assembly on a vehicle to the processing system. Utilizing the provided measurements, the processing system is configured to identify alternative vehicle wheel assembly configurations which will fit the vehicle, based on wheel assembly width and diameter as determined from a database of available vehicle wheel assembly sizes (Box 510). Alternatively, if no database is available, the vehicle wheel balancer system may optionally provide an identification of calculated wheel assembly configurations which may fit the vehicle.

Those of ordinary skill will recognize that the functionality of the present invention for determining axial displacements such as offset or back spacing for a wheel assembly mounting pad disposed against the spindle face of a spindle shaft may be incorporated into a wide range of vehicle service applications, and that such determined axial displacements may be utilized in a wide range of applications which include, but are not limited to, display to an operator, communication to other vehicle service devices, storage in an electronic memory for subsequent recall, and determination of wheel assembly fitments and vehicle handling characteristics, The present disclosure can be embodied in the form of computer-implemented processes and apparatuses for practicing those processes. The present disclosure can also be embodied in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the present disclosure.

The present disclosure can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. An improved vehicle wheel assembly service system having a spindle shaft for receiving, at a spindle face with a known axial location, a wheel rim of a vehicle wheel assembly, and a processing system configured to receive measurement data associated with a wheel rim mounted against the spindle face on the spindle shaft, the improvement comprising:

the processing system configured to utilize the received measurement data and the known axial location of said spindle face to determine a wheel rim axial displacement associated with a mounting pad surface of the wheel rim mounted against the spindle face.

2. The improved vehicle wheel assembly service system of claim 1 wherein said determined wheel rim axial displacement associated with said mounting pad of the vehicle wheel assembly is a wheel assembly rear spacing measured between an axial position of an inner edge of the wheel rim and an axial position of the mounting pad surface.

3. The improved vehicle wheel assembly service system of claim 1 wherein said determined wheel rim axial displacement associated with said mounting pad of the vehicle wheel assembly is a wheel assembly offset measured between a wheel rim axial center plane and the mounting pad surface.

4. The improved vehicle wheel assembly service system of claim 3 wherein said received measurement data includes an axial location of an outer wheel rim, and an axial location of an inner wheel rim.

5. The improved vehicle wheel assembly service system of claim 1 wherein said processing system is configured to utilize said determined wheel rim axial displacement to identify at least one alternative vehicle wheel assembly configuration.

6. The improved vehicle wheel assembly service system of claim 1 wherein said processing system is configured to provide a display of said determined wheel rim axial displacement.

7. The improved vehicle wheel assembly service system of claim 1 wherein said processing system is configured to utilize said determined wheel rim axial displacement in combination with vehicle-specific data to identify at least one fitment parameter for installation of said vehicle wheel assembly on a vehicle.

8. The improved vehicle wheel assembly service system of claim 7 wherein said vehicle-specific data is provided by an operator.

9. The improved vehicle wheel assembly service system of claim 7 wherein said vehicle-specific data is obtained from a database.

10. The improved vehicle wheel assembly service system of claim 7 wherein said at least one fitment parameter includes a measure of clearance between the vehicle wheel assembly and a component of said vehicle.

11. The improved vehicle wheel assembly service system of claim 1 wherein said processing system is configured to store said determined wheel rim axial displacement from a first vehicle wheel assembly; and wherein said processing system is further configured to utilize said stored wheel rim axial displacement to determine if a second vehicle wheel assembly having a different configuration from said first vehicle wheel assembly is a suitable replacement for said first vehicle wheel assembly.

12. The improved vehicle wheel assembly service system of claim 1 wherein said vehicle wheel assembly service system is a vehicle wheel balancing system, and wherein said processing system is configured with instruction code for carrying out vehicle wheel assembly balancing procedures.

13. The improved vehicle wheel assembly service system of claim 1 wherein said vehicle wheel assembly service system is a tire changing system, and wherein said processing system is configured with instruction code for carrying out vehicle wheel assembly tire changing operations.

14. An improved vehicle wheel assembly service system having a processing system configured to receive measurement data associated with a vehicle wheel assembly mounted against a spindle face on a spindle shaft, the improvement comprising:

the processing system configured to utilize the received measurement data and a known axial location of said spindle face to determine an axial displacement associated with the mounting pad of the vehicle wheel assembly mounted against the spindle face;

wherein said received measurement data includes a measure of wheel assembly radius; and wherein said processing system is configured to determine at least one brake force parameter associated with the vehicle wheel assembly.

15. The improved vehicle wheel assembly service system of claim 14 wherein said processing system is configured to determine a change in said at least one brake force parameter from a determined brake force parameter associated with a second vehicle wheel assembly having a different configuration from said vehicle wheel assembly.

16. The improved vehicle wheel assembly service system of claim 15 wherein said processing system is configured to provide a display of said determined change in said at least one brake force parameter.

17. A method for measuring a vehicle wheel assembly including a wheel rim, comprising:

mounting said wheel rim to a spindle of a vehicle wheel assembly service system by positioning a mounting pad of said wheel rim against a face of said spindle, said spindle having an axis of rotation and said face of said spindle having a known axial position along said axis of rotation;

identifying an axial position along said axis of rotation associated with at least one rim edge of the wheel rim;

determining within the wheel rim, a measure of axial displacement associated with said mounting pad of the wheel rim mounted against the spindle face, utilizing said identified axial position of said at least one rim edge together with said known axial position of the spindle face.

18. The method of claim 17 wherein said at least one rim edge is an inboard rim edge; and wherein said determined measure of axial displacement associated with said mounting pad is a measure of rear spacing of the vehicle wheel assembly.

19. The method of claim 17 further including the step of utilizing said determined displacement associated with the vehicle wheel assembly mounting pad in combination with at least one vehicle clearance limitation to display a representation of at least one alternate vehicle wheel assembly configuration which fits within said at least one vehicle clearance limitation.

20. The method of claim 19 wherein said at least one alternate vehicle wheel assembly configuration is retrieved from a database containing a plurality of vehicle wheel assembly configurations.

21. A method for measuring a vehicle wheel assembly mounted against a spindle face on a spindle of a vehicle wheel assembly service system, comprising:

identifying an axial position associated with at least one rim edge of the vehicle wheel assembly;

determining an axial displacement associated with a mounting pad of the vehicle wheel assembly mounted against the spindle face, utilizing said identified axial position together with a known axial position of the spindle face;

identifying a second axial position associated with a second rim edge of the vehicle wheel assembly;

determining an axial center for the vehicle wheel assembly utilizing said first and second identified axial positions; and determining an offset of said mounting pad of the vehicle wheel assembly utilizing said determined axial center and said known axial position of the spindle face.

22. The method of claim 21 wherein at least one of said identified axial positions is provided by an operator.

23. The method of claim 21 wherein at least one of said identified axial positions is acquired from data acquisition components associated with said vehicle wheel assembly service system.

\* \* \* \* \*